Patented Apr. 13, 1937

2,076,624

UNITED STATES PATENT OFFICE 2,076,624

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application November 16, 1936, Serial No. 111,175

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process is obtained by sulfonating an alkali-soluble condensation material obtained by reaction between an alkylene oxide body and a resin body derived in part from a phenol. The alkylene oxide bodies include the alkylene oxides, alkylene halohydrins, hydrogenated or hydroxy alkylene oxides, or similar obvious functional equivalents of the alkylene oxides.

As stated in British Patent 447,417, dated May 18, 1936, to I. G. Farbenindustrie Aktien-Gesellschaft, materials of the kind referred to can be prepared readily from the directions contained in said British patent, and which directions in substantially verbatim form are as follows:

The following substances containing phenolic hydroxyl groups may be used as initial materials for the present process: synthetic resins such as can be obtained by condensing phenols with aldehydes, if desired in combination with urea, thiourea, arylsulphonamides, phenol sulfonic acids or naphthalene sulfonic acids; the condensation products of phenols alone or in the presence of aldehydes or, if desired, urea with resin acids or derivatives thereof or other carboxylic acids and glyptals; the resinous extracts from vegetable tanning materials containing phenolic groups such as quebracho extract; moreover, such resins as are obtainable from phenols by reacting thereon with sulphur, sulphur halides, unsaturated high molecular fatty acids or unsaturated hydrocarbons such, for instance, as acetylene or butadiene hydrocarbons. On the other hand, as alkylene oxide components of the initial materials there may be mentioned for instance: ethylene oxide, propylene oxide, butylene oxide, glycide or mixtures thereof and also the corresponding alkylene hydrins and the epihalogen hydrins.

By selecting the initial materials according to the degree of condensation of the phenol resins or resinous materials and the quantity of the alkylene oxide caused to react therewith, the properties of the alkylene resins obtained can be varied to a certain degree.

For example, the phenol resins treated with a small amount of ethylene oxide yield products or mixtures which contain unreacted initial material, are still completely insoluble in water, but can be easily rendered water-soluble by sulfonation. By causing the initial materials to react with more alkylene oxide, products are obtained which can be more easily sulfonated and finally, by causing the initial materials to react with a large amount of alkylene oxides, products are obtained which are soluble in cold water without any further treatment and from the solutions of which the resin is precipitated when they are warmed. By treating these products with sulphonating agents, substances are obtained which are soluble even at elevated temperatures.

The alkylene oxides are introduced into the dissolved or melted phenol resins preferably with the addition of basic reacting substances as catalysts. According to the amount of the alkylene oxide employed, the hydroxyl groups present in the initial material will probably be esterified or etherified wholly or partially by oxyalkyl or polyoxyalkyl groups. If other groups capable of reacting with alkylene oxides are present, such, for instance, as carboxyl or sulphonamide groups, these groups will probably also take part in the reaction. Ethylene oxide, propylene oxide, butylene oxide, etc. represent suitable alkylene oxide bodies.

The reaction of the alkylene oxide resins with the sulphonating agents is performed easily and extremely quickly. In order to obtain products which are soluble in water, it is sufficient in some cases to use sulphuric acid of medium strength, for instance 60–66° Bé., the temperature being not higher than 20–30° C. The sulfonation can also be carried out in the presence of solvents such, for instance, as glacial acetic acid or phosphoric acid, but in many cases the use of solvents is not at all necessary. However, also stronger sulfonating agents such, for instance, as monohydrate, oleum or chlorsulfonic acid may be employed, and the reaction may then be performed at lower temperatures and in the presence or absence of diluents.

As to the manufacture of synthetic resins or resinous substances from phenols, reference is made to the various specific items under the index heading of "Phenol" which indicate and refer to resinous combinations or synthetic resin combinations, in "Chemistry of Synthetic Resins", Ellis, 1935, Vol. II, pages 1559–1566.

The following examples illustrate the manufacture of the demulsifying agents employed in the present process. The parts are indicated by weight:

Example 1

(a) 44 parts of a 33% sodium hydroxide lye are stirred at 80–90° C. into a melted resin prepared from 94 parts of phenol and 86 parts of a 30% aqueous solution of formaldehyde, the above procedure being described in German patent, No. 219,728, dated Mar. 4, 1910, to Knoll and Company. Ethylene oxide is then introduced into the alkaline solution until the weight has increased by 36 parts. Without removing the water, 55 parts of sulphuric acid of 60° Bé. and 240 parts of sulphuric acid of 66° Bé. are gradually stirred into the solution, the temperature being maintained between 80–90° C. During the sulfonation, part of the water is evaporated in vacuo at the same temperature until a test portion taken from the reaction mixture is soluble in five to ten times its weight of water. Then the mixture is introduced into water, and the reddish reaction product is thereby precipitated. After separating from the acid liquor, the product is dissolved in water, neutralized with ammonia and, after adding traces of sodium bisulfite, separated by adding an aqueous solution of sodium chloride. After drying, a colorless powder is obtained, which is easily soluble in water.

(b) Instead of 36 parts of ethylene oxide, 88 parts are introduced, and the reaction mixture is treated in the manner described above with 165 parts of sulphuric acid of 66° Bé. at 70° C. and treated in the same manner as described above. An almost colorless powder of similar properties is obtained.

(c) If the resin is treated with 161 parts of ethylene oxide instead of with 36 parts, the reaction mixture can be converted after drying in vacuo into a very easily water-soluble product by treating with only 70 parts of sulfuric acid of 66° Bé. at 60–65° C. The product can be separated from its aqueous solution in an oily condition by adding sodium chloride.

It is also possible to make the ethylene oxide resins water-soluble by dissolving them in glacial acetic acid and treating them with monohydrate, fuming sulfuric acid or chlorsulfonic acid; temperatures of 20–40° C. are sufficient.

Example 2

33 parts of a 33% sodium hydroxide lye are stirred at 70–80° C. into a melted resin prepared from 100 parts of o-cresol and 80 parts of a 30% aqueous solution of formaldehyde as described in the German patent previously referred to. Ethylene oxide is then introduced into the alkaline solution until the weight has increased by 30 parts. 85 parts of sulfuric acid of 60° Bé. and 180 parts of sulfuric acid of 66° Bé. are gradually stirred into the solution, the temperature being still maintained at 70° C. for one hour. A test portion washed free from acid, will then be water-soluble. The reaction product can be worked up in the manner described in Example 1. If a larger amount of sulfuric acid is employed, for example 370 parts of 66° Bé., the product obtained is still more easily soluble.

Example 3

70 parts of a product obtained in accordance with Example 1, subdivision (a), are dissolved in 300 parts of water. 5 parts of a 30% aqueous solution of formaldehyde and 5 parts of 10-N-sulfuric acid are added. The mixture is then heated for 3½ hours in a boiling water bath under reflux. The formaldehyde is gradually consumed, and the liquid grown slightly opalescent. After neutralizing the sulfuric acid a solution is obtained which is a thin liquid at higher temperatures and which, at ordinary temperature, solidifies to form a solid mass. A 10% solution is still viscous at lower temperatures and is of about the same consistency as a 30% solution of a product not treated with formaldehyde.

Example 4

An alkali soluble resin is prepared from 94 parts of phenol, 117 parts of a 30% aqueous solution of formaldehyde, 19.4 parts of urea and 2.5 parts of 40% sulfuric acid by heating the solution of these starting materials to 85° C. for 4½ hours under reflux. The resin separated is brought into solution at 90–95° C. by stirring with a mixture of 50 parts of 33% sodium hydroxide lye and 40 parts of water. Ethylene oxide is then introduced at 70–80° C. until the weight has increased by 58 parts. The reaction product is treated at 60° C. with 350 parts of sulfuric acid of 66° Bé. until a test portion washed free from acid is easily water-soluble. The sulfonation mixture is then, while stirring, poured on ice water, and separates as a solid mass. The liquid is sucked off, the product washed with a small amount of cold water, dissolved in hot water and the solution neutralized with sodium hydroxide lye. After evaporation to dryness, a light brown product is obtained. Instead of phenol, the equivalent amount of o-chlorphenol may be employed; the product thus obtained is not so easily soluble in water.

Example 5

900 parts of colophony are heated for 10 hours with 450 parts of crude cresol to which 42 parts of surfuric acid of 60° Bé. are added as condensing agent. A brownish, alkali soluble resin is obtained, which is brought into solution with the aid of 730 parts of 16.5% sodium hydroxide lye.

133 parts of this solution are treated at 60–70° C. with ethylene oxide until the weight has increased by 20 parts; no alteration of the solution is visible during this treatment. 290 parts of sulfuric acid of 66° Bé. are gradually stirred into the solution during one hour at 40–50° C. The resin is dissolved with a brown-red coloration. The temperature is maintained at 45° C. for one hour. The solution is then allowed to cool. 18 hours later, the solution is introduced into a mixture of ice and water; the reaction product separates as a solid, brown mass. The liquid is sucked off and the product is washed with a small amount of cold water and dissolved in warm water. The solution is then neutralized with sodium hydroxide lye. 1-2 parts of sodium bisulfite are added. The product is salted out and dried. A yellow powder is obtained, which is easily soluble in water.

If the alkaline resin solution is treated with 30 parts of ethylene oxide, the reaction product can be sulphonated even at 300° C., whereas the resin which has not been treated with ethylene oxide can only be sulfonated incompletely even at 100° C. yielding a dark brown insoluble product, without appreciable value for demulsification of crude oil emulsions.

A resin obtained from 100 parts of colophony and 300 parts of crude cresol behaves similarly on sulfonation and the products obtained exhibit similar properties.

*Example 6*

150 parts of a colophony cresol resin prepared in accordance with Example 5 are stirred at slightly elevated temperatures with 14 parts of a 33% sodium hydroxide lye. The water is evaporated in vacuo. The resin is melted at 120° C. and ethylene oxide is introduced. Thereby, the mass becomes continuously less viscous, so that the temperature can be lowered to 60-70° C. The introduction of ethylene oxide is continued until the weight has increased by 260 parts. The product thus obtained is easily water-soluble at lower temperatures. On warming, the aqueous solution thereof becomes turbid with separation of small drops of oil; on allowing the solution to cool, it turns clear again.

240 parts of sulfuric acid of 66° Bé. are gradually stirred into 120 parts of the product obtained, the temperature being 30-40° C. A test portion taken will then be soluble to a clear solution even in hot water. The reaction product is introduced into a solution of sodium chloride. It separates in an oily condition. The separated oil is neutralized with dilute sodium hydroxide lye.

*Example 7*

My preferred reagent is made in the manner described under Example 1, subdivision (c) above, with the exception that separation is obtained without the use of sodium chloride. The acidic mass is diluted with water equal in volume to the sulfuric acid added during sulfonation, and allowed to stand until an upper layer of oily material appears. When separation is complete, the lower acidic layer is withdrawn and the upper oily layer containing the sulfonated mass is neutralized with 1-cyclohexyl amino propane-2-3-diol, obtained from glycerol monochlorhydrin and cyclohexylamine.

When a sulfonated acidic mass is washed with a solution of sodium sulfate, sodium chloride or the like, the mass that separates is apt to be partially or totally in the form of a sodium salt. It can be converted totally in the form of a sodium salt by the addition of caustic soda or the like. Sodium salts of sulfonated materials, if alcohol soluble, can be readily converted into amine salts by dissolving the amine in the form of a salt, such as the hydrochloride, together with the sodium sulfonate in alcohol. The separation of an inorganic salt, such as sodium chloride, takes place readily on application of moderate heating. The inorganic salt, such as sodium chloride, can be removed by filtration, and the alcoholic solution of the amine sulfonate evaporated or distilled so as to yield the dry product.

It is desired to point out that reference to a resin or resinous material containing a phenolic hydroxyl group or derived from a phenol is not intended to be limited to ordinary phenol of commerce, that is, hydroxy benzene or carbolic acid. The word "phenol" is used in its generic sense to mean any aromatic substance containing a hydroxyl radical attached to a nuclear carbon atom. It is intended to include polynuclear phenols, such as alpha or beta naphthol, as well as phenol. It is also intended to include the alkyl substituted phenols, such as cresols, xylenol, mesitol, etc. Similarly, substituted products such as monochlor-phenol, dichlor-phenol, etc., are included along with hydroxy phenols, etc. It is also intended to include the polyhydroxy phenols, such as resorcinol, pyrogallol, etc. As previously pointed out, the word "phenol" is used in the broadest generic sense to include all these various materials. All of these materials are the obvious functional equivalents of ordinary phenol (hydroxy benzene), as far as resinification and resin formation is concerned.

It may be desirable to indicate that the resin which is sulfonated to produce the demulsifying agent employed in the present process, is not obtained by sulfonation of an ordinary phenolic resin or ordinary phenolic resinous material. It is the condensation material obtained after treatment with an alkylene oxide or its equivalent. In order to emphasize this particular point, the nomenclature employed in the claims will be directed to a material or demulsifying agent obtained by sulfonation of a phenolic alkylene oxide condensation material. So far as I am aware, when phenolic resins are treated with alkylene oxides or their equivalents, preferably in presence of a suitable catalyst, such as an alkali, the resulting material, provided that it is alkali soluble, although still solid in nature, is deprived of its valuable physical properties which give conventional resins or resinous materials utility in the various arts. It is only after a second treatment with a suitable sulfonating agent that one obtains a material which is not only entirely different from the original phenolic resin, but also entirely different from the phenolic alkylene oxide condensation material from it is derived. It has properties of the kind that make it valuable as a demulsifying agent for crude oil emulsions.

The expression "alkylene oxide" is used in the generic sense, not only to mean alkylene oxide, but also to mean any obvious functional equivalent of the kind previously pointed out, such as halohydrin, including the chlorhydrins or bromhydrins, the hydrogenated alkylene oxides, the hydroxy alkylene oxides, or other similar materials. The derivatives of glycerol, strictly speaking, are differentiated from the alkylene oxides, insofar that the alkylene oxides are related to the glycols. It is obvious, however, for purpose of the reactions previously referred to, that glycerol derivatives, for instance, glycidol, glycerol chlorhydrin, glycerol dichlorhydrin, etc., are the obvious equivalents of the alkylene oxides in the same sense that glycerol may be considered the equivalent of ethylene glycol, or as being hydroxy propylene glycol. The alkylene oxide may be considered as derivatives of glycols.

It has been previously pointed out that materials of the kind subjected to the action of an alkylene oxide consist of synthetic resins or resinous substances obtained by the action of phenol. In some instances, the materials are entirely synthetic in nature, such as materials obtained by reactions involving phenols and various aldehydes, such as formaldehyde, furfural, etc., whereas in other instances, the resinous materials are obtained from a naturally occurring resin or resinous material, such as rosin, by the action of a phenolic body. The expression "resin body" will be used in the generic sense to include both the synthetic resin bodies and the resinous bodies obtained by the action of phenol upon naturally occurring bodies, such as rosin and the like.

In regard to the phenol aldehyde resins or resinous materials, it is to be pointed out that various aldehydes or functional equivalents thereof are employed in conventional resin manufacture. Such materials include formaldehyde, hexamethylene-tetramine, acrolein, acetaldehyde, butaldehyde, benzaldehyde, acetylene, unsaturated aldehydes, polyhydric alcohols, methylene dichloride, and various other materials. It is not necessary that phenolic resins, including phenolic aldehyde resins, be produced from a single phenol, and indeed, they may be produced from mixtures including such material as phenolic tars.

It is manifest that sulfonation of the alkylene oxide phenolic condensation material can be conducted in various manners, as previously pointed out, or by any conventional procedure. A sulfonated product may be used in the form of an acid, that is, as a free sulfonic acid, or it may be used in any suitable form where the acidic (ionizable) hydrogen atom has been replaced by some suitable metal or suitable organic radical. In many instances, it is desirable that the materials be used in the form of salts of various metals, especially in the form of salts of alkali metals, including the ammonium salt or the substituted ammonium salt. The salts may be obtained in any suitable manner as for example, by reacting the acidic product resulting from the sulfonation in either a crude or purified form, with metallic oxide or hydroxide, ammonia, or an organic base, or a suitable salt of one of these, preferably in an amount adapted to form a neutral product. Suitable bases, oxides, and salts include sodium, potassium, and ammonium hydroxides; sodium, potassium, and ammonium carbonates and bicarbonates; aqua ammonia; magnesium oxide; calcium oxide; ethylene amine; pyridine; triethanolamine; monoethanolamine; diethanolamine; propanol amine; butylamine; monoamylamine, diamylamine; triamylamine, cyclohexylamine; benzylamine, etc.

Not only can sulfonic acids be used as such in my present demulsification process, but they can also be converted into the salts as previously stated, and employed in such form. Similarly, they may be converted into esters by conventional procedures. A sulfonic acid, for example, can be converted into a sulfon-chloride, which can be reacted with a suitable alcohol. Esters may be obtained from alkyl alcohol, such as methyl, ethyl, propyl, butyl, amyl, hexyl alcohols, or from aralkyl alcohol, such as benzyl alcohol, so-called aromatic alcohols, or from cyclic non-aromatic alcohols, such as cyclohexanol, or from various other alcohols of the kind employed for the manufacture of esters. The sulfonic acids may be obtained by diluting the acid mass with just sufficient water so that the material separates as an acid, or by treating the sodium salt if formed with hydrochloric acid or in any other manner desired.

Reference is made to pending application for patent, Serial No. 101,437, of Melvin De Groote and Arthur F. Wirtel, filed September 18, 1936. The said pending application is concerned with demulsification of crude oil emulsions by means of certain amine salts of specifically described alkylated aromatic sulfonic acids. The sulfonic acids described in said application are non-resinous in character and are different from the materials employed in the present process. However, I have found that the substituted amines employed for neutralization of the sulfonic acids of the kind described in said De Groote and Wirtel application are of unusual merit when used to neutralize the sulfonic acids or the sulfo products of the kind obtained in the present process. These amines are substituted amines derived from alkyl amines, aralkyl amines, cyclohexyl-amines, and their functional equivalents, and the substituent introduced into the amine nucleus is derived from a polyhydric alcohol or its functional equivalent; and the substituted amine itself is characterized by the presence of a residual hydroxyl. Examples of these amines are the following:

1-mono-amyl amino - 2 - hydroxy-3-propanol; 1-di-amyl amino-2-hydroxy-3-propanol; 1-3 bis amyl amino-2-propanol; 1-3 bis di-amyl amino-2-propanol; 1-mono benzyl amino propane-2,3-diol; 1,3, bis benzyl amino-2-propanol; bis-glycero-benzylamine.

As to other suitable materials of this kind, reference is made to the numerous specific examples which appear in the above mentioned pending application of De Groote and Wirtel.

Water soluble salts of the sulfonic acids may be converted into water insoluble materials by various procedures, such as by reaction with heavy metal salts, such as lead salts, iron salts, copper salts, zinc salts, etc. In some instances, the water insoluble salts are particularly suitable.

It may be well to direct attention to the fact that the phenolic resins and phenolic resinous materials of the kind referred to and prior to treatment with an alkylene oxide body are believed to be of a type in which the phenolic hydroxyl group still persists, at least in part, in the final resin or resinous material. These resins are sometimes characterized as containing phenolic hydroxyl groups, although this assumption or conclusion is based largely upon the fact that these resin bodies were derived from phenols or phenolic bodies, and also due to the fact that reactions of the kind indicated in the process will take place with these resin bodies. Thus, reactions with alkylene oxide bodies, appear to be predicated upon the presence of a phenolic hydroxyl group, although analytical procedure to indicate that this is necessarily true, is difficult in view of numerous complexities of structure. In the claims, it has been made perfectly apparent that one may use any phenolic resin or phenolic resinous material, provided that reaction with an alkylene oxide body produces an alkali soluble condensation product, which is susceptible to sulfonation.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described my invention, what I claim as new and desire to secure by Letters Patent is:

1. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from a phenol.

2. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from a phenol, said resin body being of the natural resinous type.

3. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from a phenol, said resin body being of the synthetic resin type.

4. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from a monocyclic phenol, said resin body being of the synthetic resin type.

5. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from an unsubstituted monocyclic phenol, said resin body being of the synthetic resin type.

6. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a resin body derived in part from monohydroxy benzene, said resin body being of the synthetic resin type.

7. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and an aldehyde type resin body derived in part from monohydroxy benzene.

8. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body and a formaldehyde type resin body derived in part from monohydroxy benzene.

9. A process for breaking petroleum emulsions of the water-in-oil type, which consists in subjecting the emulsion to the action of a demulsifying agent comprising a substance produced by sulfonating an alkali-soluble condensation material obtained by reaction between an alkylene oxide body of the type formula $C_nH_{2n}O$, and a formaldehyde type resin body derived in part from monohydroxy benzene.

10. A process for breaking petroleum emulsions of the water-in-oil type, which consists in subjecting the emulsion to the action of a demulsifying agent comprising a substance produced by sulfonating an alkali-soluble condensation material obtained by reaction between ethylene oxide and a formaldehyde type resin body derived in part from monohydroxy benzene.

11. A process for breaking petroleum emulsions of the water-in-oil type, which consists in subjecting the emulsion to the action of a demulsifying agent comprising a substance produced by sulfonating an alkali-soluble condensation material obtained by reaction between ethylene oxide and a formaldehyde type resin body derived in part from monohydroxy benzene; and being additionally characterized by being in the form of a salt.

12. A process for breaking petroleum emulsions of the water-in-oil type, which consists in subjecting the emulsion to the action of a demulsifying agent comprising a substance produced by sulfonating an alkali-soluble condensation material obtained by reaction between ethylene oxide and a formaldehyde type resin body derived in part from monohydroxy benzene; and being additionally characterized by being in the form of an amine salt.

13. A process for breaking petroleum emulsions of the water-in-oil type, which consists in subjecting the emulsion to the action of a demulsifying agent comprising a substance produced by sulfonating an alkali-soluble condensation material obtained by reaction between ethylene oxide and a formaldehyde type resin body derived in part from monohydroxy benzene; and being additionally characterized by being in the form of a 1-cyclohexanol amino propane-2,3-diol salt.

14. A process for breaking petroleum emulsions of the water-in-oil type, which consists in subjecting the emulsion to the action of a demulsifying agent comprising a substance produced by sulfonating an alkali-soluble condensation material obtained by reaction between ethylene oxide and a formaldehyde type resin body derived in part from monohydroxy benzene; and being additionally characterized by being in the form of a 1-cyclohexanol amino propane-2,3-diol salt, admixed with a suitable solvent.

MELVIN DE GROOTE.